June 25, 1968  R. A. SEMPLAK  3,389,601
VARIABLE CAPACITANCE LIQUID FLOW GAUGE
Filed June 29, 1966  2 Sheets-Sheet 1
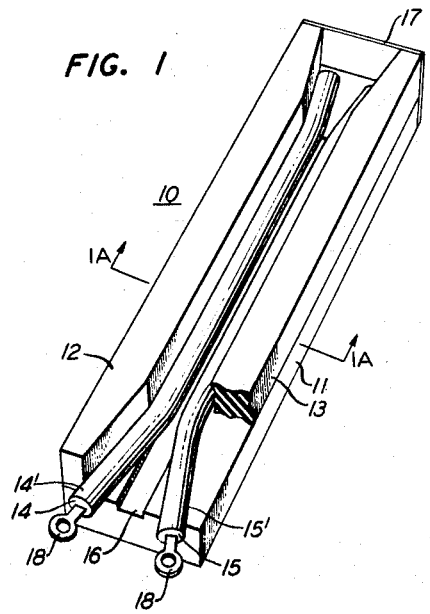
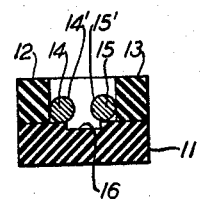
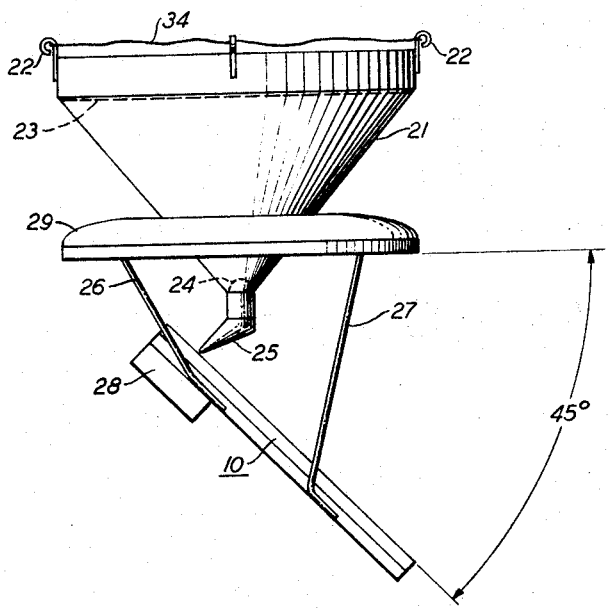
INVENTOR
R. A. SEMPLAK
BY
ATTORNEY June 25, 1968  R. A. SEMPLAK  3,389,601
VARIABLE CAPACITANCE LIQUID FLOW GAUGE
Filed June 29, 1966  2 Sheets-Sheet 2

United States Patent Office 3,389,601
Patented June 25, 1968

3,389,601
VARIABLE CAPACITANCE LIQUID FLOW GAUGE
Ralph A. Semplak, Shrewsbury, N.J., assignor to Bell Telephone Laboratories, Incorporated, Berkeley Heights, N.J., a corporation of New York
Filed June 29, 1966, Ser. No. 561,425
3 Claims. (Cl. 73—171)

ABSTRACT OF THE DISCLOSURE

A flow measuring device in which the volume of liquid flowing between two parallel capacitor plates is sensed by a measuring circuit.

---

This invention relates to liquid flow measuring apparatus and, more particularly, to a continuously measuring variable capacitance gauge.

It has been desirable for various purposes to measure the rate of flow of a liquid. Similarly, to know the rate of rainfall and/or the total amount of rainfall over a given area is useful in such diverse fields as meteorology, electromagnetic wave propagation, and hydrology. The present invention provides means for measuring rainfall by monitoring fluid flow. Although the invention will be disclosed in the perspective of electromagnetic wave propagation studies, its application to other fields in which either rainfall measurement or liquid flow rates are of interest is not in any way intended to be minimized.

Studies of the effect of rain on electromagnetic wave energy transmission through the atmosphere at centimeter wavelengths have indicated that the attenuation is inversely related to wave length. Attenuation becomes noticeable in the 6 centimeter wavelength range and increases approximately as $\lambda^{-2}$. The substantial lack of specific information on both temporal and spatial characteristics of rainfall made it desirable that such information be gathered incident to the design of higher frequency systems, such as for example, optical frequency satellite transmission systems.

To gather such information, it was necessary to carry out rainfall rate studies. Initial consideration was given to the use of the well known tipping bucket gauge which comprises a two compartment pivoted bucket that tips and empties itself when one compartment has accumulated a predetermined small amount of water, at the same time exposing the other compartment for filling. While accurate for moderate rainfall rates, tipping bucket gauges are characterized by lost rain error for heavy rainfall rates since the time for tipping is constant. In addition, the tipping bucket is relatively insensitive to changes in rainfall rate at low rainfall levels. Both of these shortcomings can be attributed to the fact that the tipping bucket measurement is discontinuous.

One object of the present invention is therefore to measure liquid flow in a manner sensitive to continuous variations.

In addition, the output data in accordance with the invention are in a form readily adaptable for computer operation.

In accordance with the invention, the high dielectric constant of a flowing liquid is used to change the frequency of an oscillator. More specifically, the liquid to be measured is directed to flow down an inclined plane between the insulated metallic electrodes of a capacitor. The capacitance presented is thus a function of the amount of liquid flowing between the electrodes.

As applied to rainfall gauges, a sample of rain is first intercepted and diverted to flow into the variable capacitance element. The absence of rain is indicated by a first oscillator frequency; increasing rainfall and higher flow rates are indicated by decreasing oscillator frequencies.

The above and other objects of the present invention as well as its numerous advantages, can be more readily understood from reference to the accompanying drawing and to the detailed description thereof which follows.

In the drawing:

FIG. 1 is a perspective view, partially broken away, of a variable flow capacitor in accordance with the invention;

FIG. 1A is a transverse cross-sectional view of the capacitor of FIG. 1;

FIG. 2 is a plan view of a rainfall rate gauge including the variable flow capacitor of FIG. 1;

Figure 3:
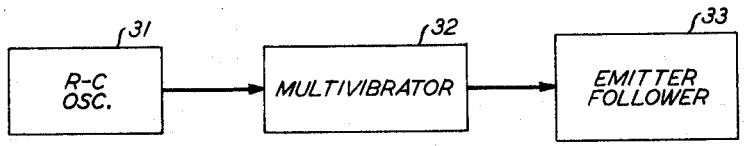
FIG. 3 is a block diagram of an electronic circuit incorporating the invention.

More specifically, FIG. 1 of the detailed drawing shows a variable capacitor 10 comprising a base plate 11 and upper siderails 12, 13, all of which can comprise a dielectric such as Plexiglas. A splash plate 17 partially closes one end of the device so that incident liquid is not lost. The base plate and siderails form a channel in the lower corners of which lie rods 14, 15. These rods, which form the electrodes of a variable capacitor, can comprise #10 gauge insulated wire each with an additional sheath 14', 15' of 1.5 mil dielectric film disposed thereon to ensure good electrical insulation. Terminals 18 on the ends of rods 14, 15 provide means for incorporating capacitor 10 into an external circuit. Each of rails 12, 13 has a tapered end portion which permits the capacitor rods to flare. A typical overall length for the capacitor is 12 inches, with one inch tapered end portions. Thus the active region within which the liquid flow and capacitance are critically related typically extends along a 10 inch portion.

Since the presence of a single drop of liquid flowing between the electrodes is sufficient to change the capacitance, it is advantageous to mill a shallow channel 16 in the upper surface of base plate 11, between the rods 14, 15. For low flow rates, in which essentially individual drops flow between the rods, the liquid passes below the rods and hence through a region of weak electric field. As the rate increases, however, the liquid level along the rods rises into a region of more highly concentrated electric field, and linear operation is realized.

FIG. 1A, a cross-sectional view of the capacitor of FIG. 1 taken at line 1A—1A, indicates the physical relationships among the various portions of the structure. In an actual model of the capacitor the rails 12, 13 were spaced apart a distance of ¼ inch, rods 14 and 15 were of .101 inch diameter, and channel 16, of $\frac{1}{32}$ inch depth and ⅛ inch width was centered in the upper surface of base member 11. Dielectric sheaths 14', 15' are .0015 inch thick. Thus channel 16 extends under overhanging portions of the capacitor rods. Changing the size of the channel or the diameter of the rods will change the output relationship of flow rate and capacitance.

In FIG. 2, the variable flow capacitor of FIG. 1 is incorporated into a specific arrangement for rain rate measurement. Rainfall is intercepted and collected by a circular funnel-like member 21 having angled supports 22 extending upward therefrom. These supports are spaced around the funnel lip and are loosely threaded by a wire 34, which acts to deter birds from perching on the funnel. Wire 34 can comprise, for example, #30 Nichrome wire. By positioning five supports 22 and the lip of funnel 21, it has been found that the problem of rain gauge clogging from bird droppings has been reduced to a negligible level. It is believed that both the looseness of the wire 34 and its shiny surface act together to repel perching on any of the upper gauge parts.

In order to keep foreign matter out, a mesh screen 23 covers funnel 21 at its portion of greatest diameter. Such a screen can be of ⅜ inch mesh, for example. At the funnel bottom, a second screen 24, of smaller mesh size than screen 23, such as ⅛ inch mesh, acts as a final screen for unwanted foreign matter.

The rainwater collected by the screened funnel arrangement is then directed by spout 25 into the variable capacitor 10 which is supported by braces 26, 27 at an angle of 45° from the horizontal. Decreasing the angle of incline increases the capacitance change caused by increasing rainfall. The angle of 45° was selected as one which would not only provide reasonable capacitance changes for varying rainfall, but would also ensure that foreign matter which passed through the double screen arrangement would most likely be flushed through the capacitor.

Associated with capacitor 10 and placed in proximate relationship thereto is electronic package 28, which is fastened below the capacitor structure. A lid portion 29 shields the variable capacitor and associated equipment from stray rain. Typically, the portion of the gauge below lid 29 is enclosed in order to minimize spurious rain and wind effects. This enclosure is not shown in FIG. 2.

As stated before, the variable capacitor 10 is used as the variable element in a resistance-capacitance relaxation oscillator. Such an oscillator is contained within electronic package 28 and is a well-known circuit arrangement readily found in electronic circuit textbooks. To ensure a suitable relationship between oscillator frequency and rain rate, with a dry capacitance of 10 pico-farads, a 25 kilocycles per second frequency was selected for the oscillator. A rain rate of 280 millimeters per hour then produces an output frequency of 4 kilocycles per second.

A typical rain rate monitoring system would involve many individual rain gauges as described. One problem which arises is the provision of a power supply at each of the gauge locations which may number one hundred or more and which may be spaced over many square miles of terrain. In an experimental system of rain gauges, it was decided that the use of a separate local battery at each individual gauge was undesirable, particularly since the frequency output of each gauge was being transmitted over a subscriber telephone pair of wires. In view of the use of the telephone plant for transmission, the battery current from the local telephone central office could also be used. This arrangement also ensured that, in the event of a primary power failure—a not infrequent occurrence during rainstorms—the rain gauges will continue to function. However, transmission characteristics of a subscriber telephone pair precludes the use of frequencies much above 8 kilocycles per second unless the telephone pair has been modified by removing certatin loading coils and bridge taps. With modification, the usable frequency range of a line pair can be extended to 12 kilocycles per second.

Since the oscillator is adjusted to operate up to 25 kilocycles, a modification of the output, as indicated by the block diagram of FIG. 3, will be required before actual transmission. A multivibrator 31 can be used to divide the output frequency of the relaxation oscillator 32 by a factor of two, thus maintaining the desired characteristics of the oscillator and simultaneously halving the frequency bandwidth required. In addition, the multivibrator provides a square wave output with a fifty percent duty cycle which is a decided improvement over the typical narrow spikes provided by a relaxation oscillator alone. An emitter follower 33 is used to couple the output to the telephone pair, thus permitting a single pair to be used both for supplying the battery power and for transmitting the information-bearing signal.

The output signal can then be sampled at a desired rate, and the resulting frequency information can be used as the input to a computer. Information enabling large scale plotting of rainfall rate data then becomes readily available. It has been found that a monitoring rate of a single scan of each of 100 gauges in 100 seconds is acceptable. Once rain is detected at any gauge within the system, the scan rate is increased to once each 10 seconds.

Figure 4:
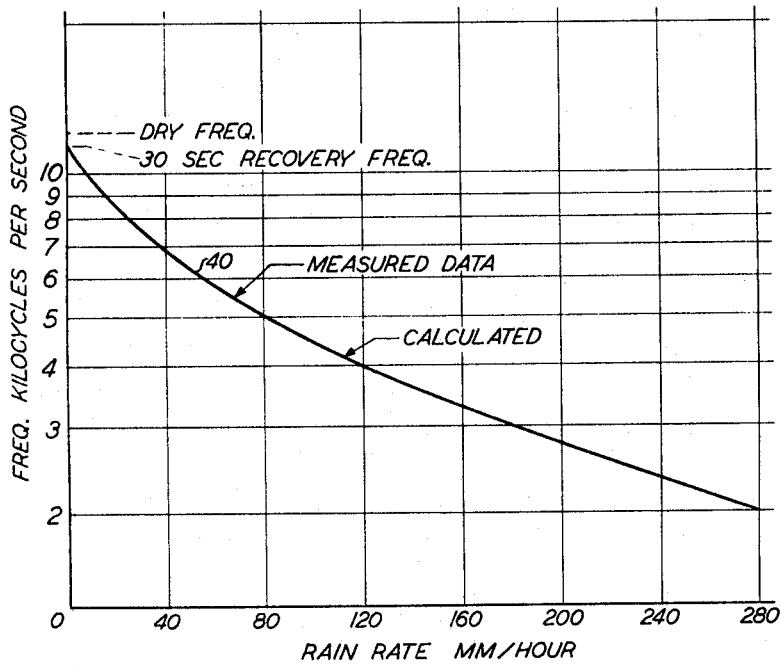
FIG. 4 is a calibration curve indicating the dependence of frequency output on liquid flow rate in the embodiment of FIG. 2.

A calibration curve for the rain gauge of FIG. 2 is shown in FIG. 4, in which output frequency in kilocycles per second is plotted as a function of rain rate in millimeters per hour. Measured data are indicated by small x's and the calculated data by smooth curve 40. It can be seen from FIG. 4 that the gauge can resolve heavy rainfall rates and that the log frequency vs' rain rate is quite linear for rates greater than 50 mm./hour. It can also be seen that the dry frequency and the frequency 30 seconds after the flow stops are not identical. This is due to the residual effect of moisture on the capacitor electrodes. As the moisture evaporates, the output frequency approaches the dry frequency.

It is understood that the invention, disclosed with specific reference to the use of water as the medium whose flow is measured, is not limited to this particular fluid. Any fluid that will flow easily and which has a substantial dielectric constant can be substituted.

Furthermore, the continuously variable capacitor need not be used solely with rain intercepting mechanisms. Manufacturing processes in which rates of flow of liquids are of importance could make ready use of the present invention. In such cases the electronic circuits involved could be less complex, and data transmission networks independent of the telephone plant could be employed.

What is claimed is:

1. An arrangement for measuring the rate of flow of a liquid of substantial dielectric constant comprising
    variable capacitance means including first and second conductive rod members spaced apart in fixed relationship, said members having an insulating coating thereon, the separation of said rods being greater at the extremities thereof than at their central portion,
    means for impressing an electromagnetic field on said members,
    means for causing said liquid to flow between said conductors within the region occupied by said field,
    and an oscillatory circuit associated with said capacitance means and having its frequency of oscillation controlled at least in part by said capacitance.

2. In combination with the arrangement of claim 1, means for intercepting rainfall over a predetermined area and means for directing the intercepted rainfall to flow within said variable capacitive means.

3. In combination with the arrangement of claim 2, means for sampling periodically the frequency of oscillation of said circuit, and means for applying said sampling information to an information-processing circuit.

References Cited

UNITED STATES PATENTS

| | | | |
|---|---|---|---|
| 2,213,888 | 9/1940 | Ross | 73—171 |
| 2,304,593 | 12/1942 | Peles | 52—101 |
| 2,485,148 | 10/1949 | Fralin | 52—101 |
| 3,188,865 | 6/1965 | Frost et al. | 324—61 X |
| 3,269,180 | 8/1966 | Schreiber. | |
| 3,320,528 | 5/1967 | Esenwein | 324—61 |
| 3,335,344 | 8/1967 | Kling | 73—304 X |

RICHARD C. QUEISSER, Primary Examiner.

J. W. MYRACLE, Assistant Examiner.